United States Patent
Dawson et al.

(10) Patent No.: US 8,219,616 B2
(45) Date of Patent: Jul. 10, 2012

(54) USE OF INFORMATION CHANNELS TO PROVIDE COMMUNICATIONS IN A VIRTUAL ENVIRONMENT

(75) Inventors: Christopher J. Dawson, Arlington, VA (US); Rick A. Hamilton, II, Charlottesville, VA (US); Michael J. Osias, Westtown, NY (US); Biran W. Sledge, Shreveport, LA (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/334,820

(22) Filed: Dec. 15, 2008

(65) Prior Publication Data

US 2010/0153859 A1    Jun. 17, 2010

(51) Int. Cl.
*G06F 15/16* (2006.01)
(52) U.S. Cl. ...................................................... 709/205
(58) Field of Classification Search .......... 709/202–207, 709/200, 215–219, 221–223, 227–238, 245–253
See application file for complete search history.

(56) References Cited

U.S. PATENT DOCUMENTS

| | | | |
|---|---|---|---|
| 6,020,885 A | 2/2000 | Honda | |
| 6,023,270 A | 2/2000 | Brush, II et al. | |
| 6,476,830 B1 | 11/2002 | Farmer et al. | |
| 6,560,707 B2 | 5/2003 | Curtis et al. | |
| 6,734,885 B1 | 5/2004 | Matsuda | |
| 6,772,195 B1 | 8/2004 | Hatlelid et al. | |
| 6,772,335 B2 | 8/2004 | Curtis et al. | |
| 6,865,607 B1 | 3/2005 | de Jong et al. | |
| 7,036,082 B1 | 4/2006 | Dalrymple et al. | |
| 7,086,005 B1 | 8/2006 | Matsuda | |
| 7,124,372 B2 | 10/2006 | Brin | |
| 7,234,117 B2 | 6/2007 | Zaner et al. | |
| 7,299,257 B2 | 11/2007 | Boyer et al. | |
| 2003/0080989 A1 | 5/2003 | Matsuda et al. | |
| 2003/0131001 A1 | 7/2003 | Matsuo | |
| 2006/0053389 A1 | 3/2006 | Michelman | |
| 2006/0075055 A1 | 4/2006 | Littlefield | |
| 2006/0123127 A1 | 6/2006 | Littlefield | |
| 2007/0005694 A1 | 1/2007 | Popkin et al. | |
| 2007/0168863 A1 | 7/2007 | Blattner et al. | |
| 2010/0115422 A1* | 5/2010 | Schroeter et al. | 715/751 |
| 2010/0117849 A1* | 5/2010 | Clayton et al. | 340/691.6 |
| 2010/0154003 A1* | 6/2010 | Bi et al. | 725/46 |

* cited by examiner

*Primary Examiner* — Asad Nawaz
(74) *Attorney, Agent, or Firm* — William Schiesser; Roberts Mlotkowski Safran & Cole, P.C.

(57) ABSTRACT

The invention generally relates to virtual environments, and more particularly to systems and methods for communicating in virtual environments. A method of providing communication in a virtual universe (VU) includes instantiating and assigning an information channel to a first client of the VU, associating at least one additional client of the VU to the information channel, and conveying data placed on the information channel to the first client and the at least one additional client.

17 Claims, 8 Drawing Sheets

USE OF INFORMATION CHANNELS TO PROVIDE COMMUNICATIONS IN A VIRTUAL ENVIRONMENT

FIELD OF THE INVENTION

The invention generally relates to virtual environments, and more particularly to systems and methods for communicating in virtual environments.

BACKGROUND OF THE INVENTION

The concept of a virtual universe (also called a virtual world, virtual environment, or a metaverse) is rapidly becoming a popular part of today's culture. In general, a virtual universe (VU) is a digital world (e.g., a three-dimensional computer-generated landscape) in which a user controls an avatar (e.g., a graphical representation of the user in the VU) to interact with objects and other avatars within the VU. Examples of popular VUs include SECOND LIFE (a registered trademark of Linden Research, Inc. in the United States, other countries, or both) and ACTIVEWORLDS (a registered trademark of Activeworlds, Inc. in the United States, other countries, or both).

Generally, a host computing system stores data regarding the landscape, objects, and users of the VU. A client software program runs on each user computer. The client program communicates (e.g., through a network connection) with the host system, and provides a visual (and, sometimes, audible) representation of the VU on the user computer. As the user moves his or her avatar throughout the VU, the visual representation displayed on the user computer changes according to the avatar location in the VU. In this manner, a user may cause his or her avatar to approach other avatars or objects and interact with the other avatars or objects. For example, one avatar may approach and communicate with another avatar via VOIP (voice over IP) and/or text-based communication through the network.

Other types of communication include instant messaging and chat sessions. However, these communication methods are time consuming in that they require users to constantly accept invitations for a chat session.

SUMMARY OF THE INVENTION

In a first aspect of the invention, there is a method of providing communication in a virtual universe (VU) comprising: instantiating and assigning an information channel to a first client of the VU; associating at least one additional client of the VU to the information channel; and, conveying data placed on the information channel to the first client and the at least one additional client.

In another aspect of the invention, there is a method of providing communication is a virtual universe (VU) having a plurality of clients. The method includes instantiating an information channel in the VU and associating a subset of the plurality of clients with the information channel based upon a characteristic that is common to each client of the subset of the plurality of clients. The method also includes presenting data that is placed on the information channel to each client of the subset of the plurality of clients.

In another aspect of the invention, there is a computer program product comprising a computer usable medium having a computer readable program embodied in the medium. The computer readable program, when executed on a computing device, is causes the computing device to associate a subset of a plurality of clients of a virtual universe (VU) with an information channel of the VU based upon a characteristic that is common to each client of the subset of the plurality of clients and transmit data that is placed on the information channel to each client of the subset of the plurality of clients. The data comprises at least one of text data and audio data, and the characteristic is at least one of: a geographic location within the VU, a profile parameter, and an inventory item that is common to each client of the subset of the plurality of clients.

In another aspect of the invention, there is a method for communicating in a virtual universe (VU). The method includes providing a computer infrastructure structured and arranged to: assign a VU information channel to a first VU client; associate a plurality of VU clients to the VU information channel, wherein the plurality of VU clients includes the first VU client; receive data from one of the plurality of clients via the information channel; and, transmit the data to the plurality of clients other than the one of the plurality of clients.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention generally relates to virtual environments, and more particularly to systems and methods for communicating in virtual environments. In embodiments, a virtual universe host implements and manages information channels that are associated with various clients. For example, the host may allocate and assign at least one information channel to each client of the virtual universe. In embodiments, clients may further manage their assigned channel by, for example, inviting other clients to subscribe to their channel. Any data (e.g., text, audio, etc.) that is placed onto a channel is received by all clients subscribed to the channel. In even further embodiments, plural channels may be linked together, such that any data placed onto one of the linked channels is received by all clients subscribed to any one of the linked channels. In this manner, implementations of the invention provide a dynamic communication system within the virtual universe.

As virtual worlds expand, there exists the need to implement a data communication method that allows avatars and objects within the virtual world to communicate with each other. Implementations of the invention provide a communication system that includes audio and/or data transfer, as well as the ability to dynamically change which avatars and/or objects are connected to each other during a data transfer. As such, systems and methods according to aspects of the invention provide a dynamic "multi-to-multi" data transfer in a virtual environment.

For example, implementations of the invention allow multiple avatars having a common interest or otherwise having a need for group communication to dynamically join one or more information channels to send and receive data and/or audio amongst each other. In further embodiments, information channels according to aspects of the invention provide a data link between avatars and receiver/transmitter objects (e.g., applications, business logic, RSS data feed transceivers, etc.) within the virtual world. In even further embodiments, virtual environment components of an application (e.g., a business application) may be linked by information channels to share data in order to support the application.

Figure 1:
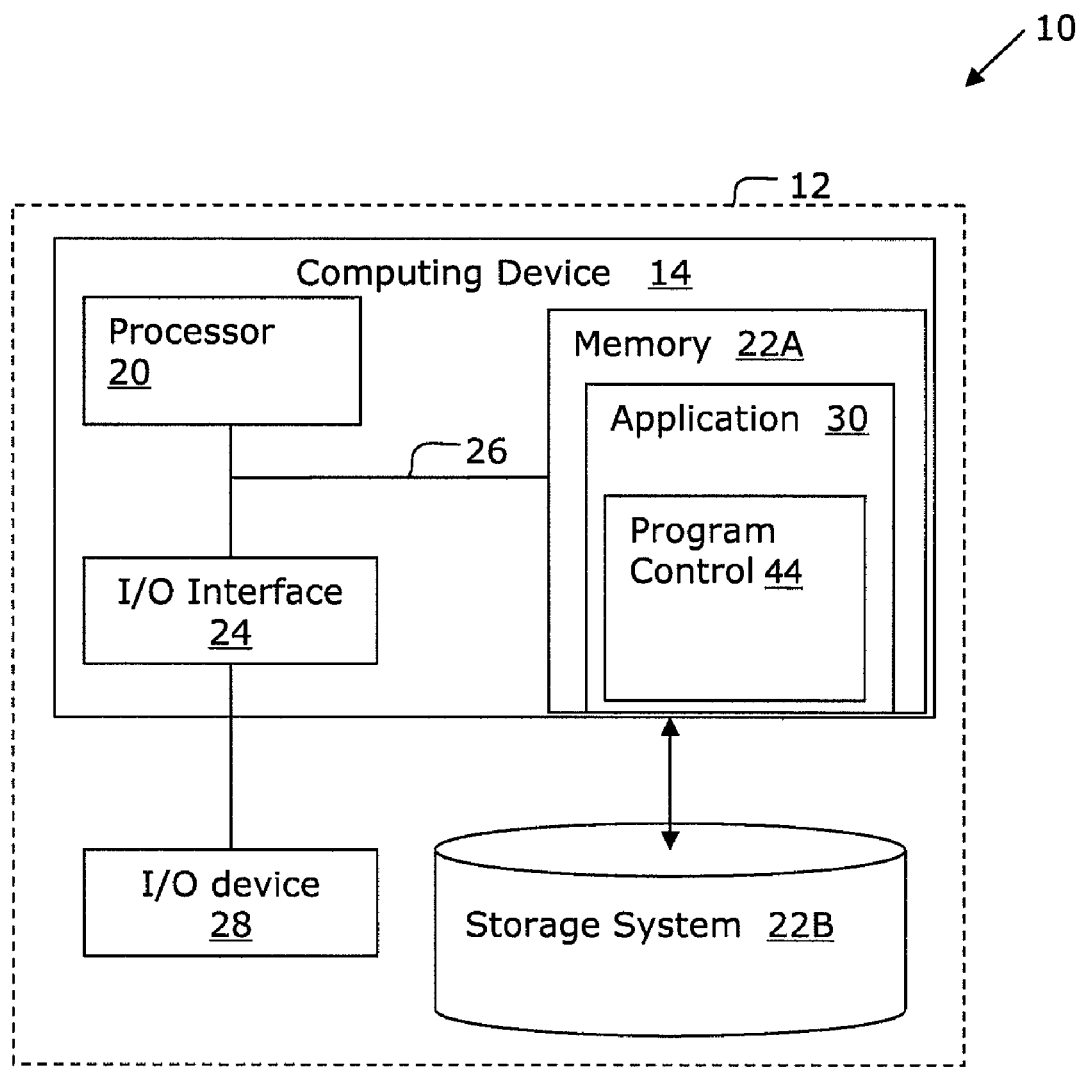
FIG. 1 shows an illustrative environment for implementing the steps in accordance with aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein. For example, the computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
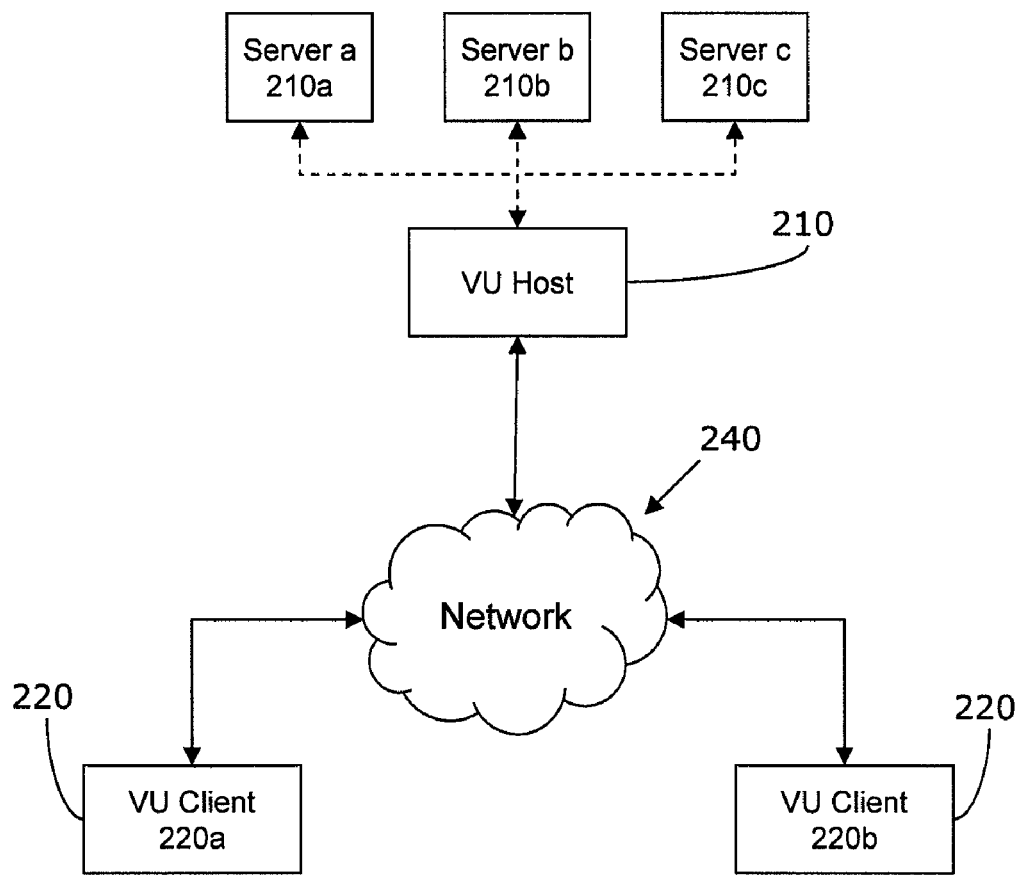
FIGS. 2-7 show exemplary systems according to aspects of the invention.

FIG. 2 shows an exemplary system according to aspects of the invention. In embodiments, a host 210 is operatively connected to at least one client 220 (e.g., clients 220a, 220b, etc.) via a network 240. The host 210 may comprise at least one computing device, such as that described with respect to FIG. 1, which operates the engine of a VU. For example, the host 210 may comprise a plurality of servers 210a, 210b, 210c and databases (such as, for example, 22B shown in FIG. 1) that store data and provide the simulation engine(s) of a VU. As is known in the art such that further explanation is not believed necessary, each server 210a, 210b, 210c may be responsible for operating the VU engine to define a portion of the VU grid. Although three servers 210a, 210b, 210c are shown, the invention is not limited to this number, and any desired number of servers may be used within the scope of the invention. Moreover, the network 240 may comprise any suitable communication network, such as, for example, the Internet.

In embodiments, the client 220 comprises a computing device, such as, for example, a general purpose computing device comprising at least a processor, memory, I/O interface, and I/O device. Such computing devices are known in the art, such that further explanation is not believed necessary. In embodiments, the client 220 operates a client program of the VU. The client 220 allows a human user to create a persona for use in the VU. For example, the persona may take the form of an avatar that is moveable throughout portions of the VU. Additionally, a profile of attributes of the user may be associated with the avatar. The profile may contain user-entered data regarding any suitable attributes of the user, such as, for example: age, gender, address, country of citizenship, occupation, hobbies, interests, etc. The profile data may be stored at the client 220 or at the host 210 (e.g., in a database, not shown). Moreover, there may be any suitable number of clients 220 (e.g., 220a, 220b, etc.) interacting with the host 210.

As used herein, a "channel" or "information channel" is a virtual universe equivalent of a citizen band (CB) radio channel or online chat. Channels per se are known, such that further explanation is not believed necessary. For example, in the popular virtual world SECOND LIFE, channel 0 is an open (e.g., public) channel, and any data (e.g., text or audio) placed on this channel by any first avatar will be received by all other avatars within a predefined distance (e.g., 20 meters) of the first avatar. In contrast to the open channel, private channels exist in which a scripted listening device (e.g., object) is required to send/receive data.

In embodiments of the invention, the VU host 210 assigns at least one private channel to each client (e.g., avatar, registered virtual world object). The host 210 may assign the channels in any suitable fashion. For example, the host 210 may designate a unique identifier for each channel and keep track of all existing channels. When a new client 220 registers with the host 210, the host 210 may assign a new channel having a new unique identifier to that new client 220. The identifiers may be, for example, alpha-numeric (e.g., channel "1000"), and the host 210 may generate identifiers in any suitable fashion (e.g., randomly, by sequence, etc.). These functions of the host 210 may be performed, for example, through programming of the VU engine.

Figure 3:
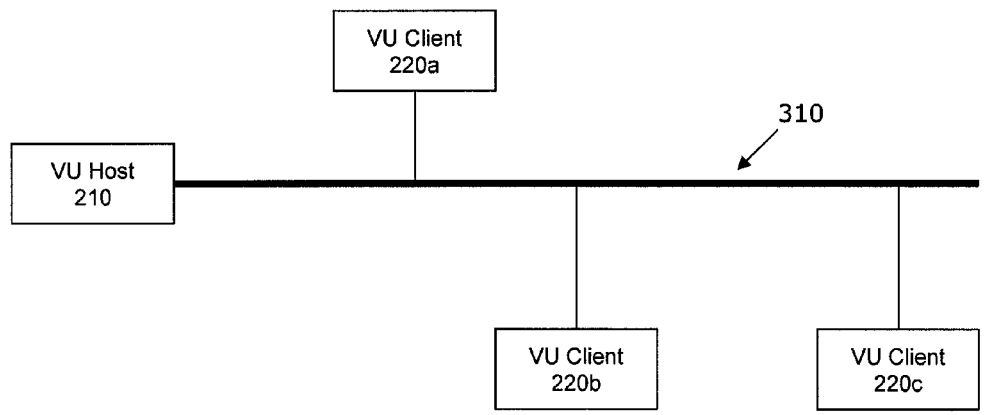

FIG. 3 shows a schematic depiction of a private channel in a VU according to aspects of the invention. In this example, private channel 310 is assigned to client 220a by host 210. In embodiments of the invention, the owner of a channel has the ability to allow other avatars or objects the ability to access the channel. In the example shown in FIG. 3, client 220a is the owner of channel 310, and has granted access to channel 310 to other clients, e.g., client 220b and client 220c. In this manner, any data placed on channel 310 by any one of the three clients 220 (e.g., client 220a) is sent to the host 210 and redirected to all of the other clients 220 on that channel (e.g., clients 220b and 220c), for example, via network 240 shown in FIG. 2.

In embodiments, an owner of a channel grants access to the channel by informing the host 210 of the identity of the client 220 to grant access to. For example, client 220a may send an invitation to client 220b inviting client 220b to join channel 310. When client 220b responds by accepting the invitation, client 220a sends a message to the host 210 instructing the host 210 to grant client 220b access to channel 310. The invitation and response may be transmitted in any suitable way, such as, for example, as a message on open channel 0, via out-of-world communication (e.g., email, telephone, etc.). In embodiments, the message from owner to host 210 includes identification of the channel and of the client to grant access to.

In embodiments, the clients 220 are associated with avatars. In this manner, human users of the VU can communicate with each other via their avatars using the private channel 310. Alternatively, the clients 220 may be associated with objects registered with the VU. For example, client 220a may be a VU business object such as a web server, and clients 220b and 220c may be data storage objects. In this manner, a business application may be operated that includes the web server sending and receiving data to and from the data storage objects.

Although three clients are shown in FIG. 3, any number of clients may be subscribed to a channel. Moreover, although alpha-numeric identifiers are described with respect to identifying private channels, any suitable identifiers may be used. Also, patterns of identifiers may be used. For example, private channels associated with avatars may be assigned an identifier beginning with the number "1", while private channels associated with objects may be assigned an identifier beginning with the number "2".

Figure 4:
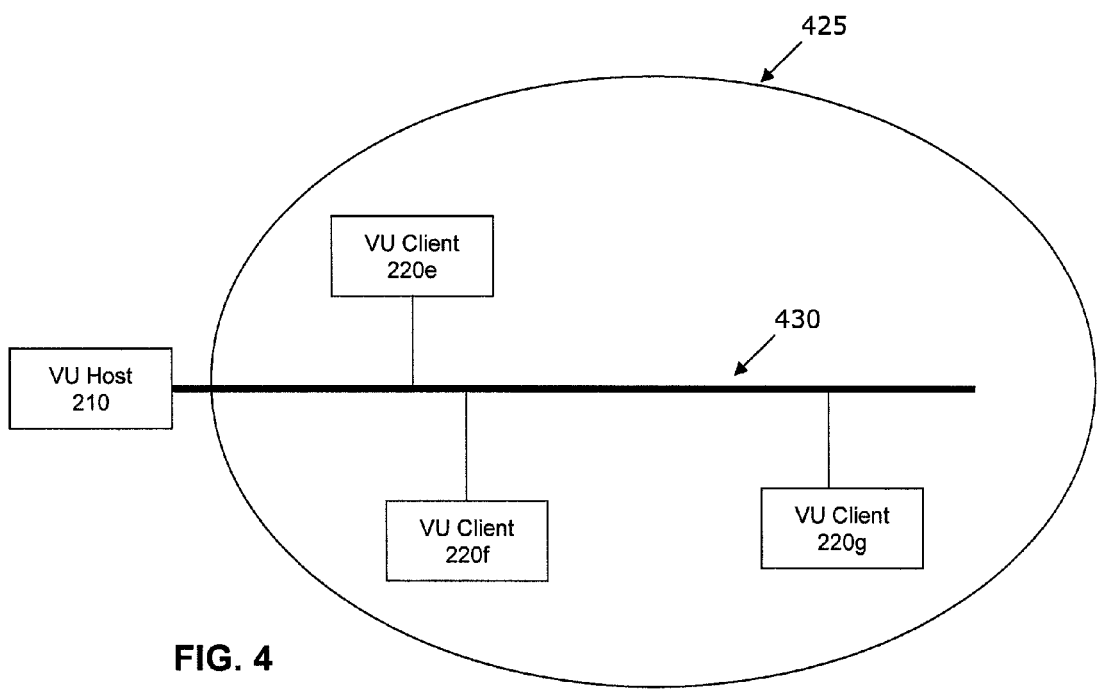

In addition to private channels described above with respect to FIG. 3, embodiments of the invention provide for public channels that are automatically assigned to clients (e.g., avatars or objects) based upon predefined parameters. For example, as shown in FIG. 4, host 210 may automatically subscribe all clients 220e, 220f, 220g, within a predefined area 425 to public channel 430. The area 425 may be any suitable area within the VU, such as, for example, a geographic area (e.g., an island, a building, etc). Accordingly, all avatars and objects that are in this area 425 of the VU are subscribed to public channel 430 and will receive any data placed on that channel. In this manner, all avatars and objects in the area 430 can communicate with each other without distance-based limitations, as would be present with, for example, open channel 0. In embodiments, the host 210 tracks the location of all avatars and objects within the VU and automatically subscribes any avatar or object to the public channel 430 associated with area 425 when the location of the avatar/object coincides with the area 425.

In embodiments, public channels may be automatically created by the host 210 based upon common characteristics of clients 220. For example, the host 210 may examine the profile and/or inventory of each avatar and subscribe avatars having common profile characteristics or inventory item to a particular public channel. In further embodiments, clients 220 have the ability to opt into or opt out of an automatic public channel subscription. For example, the host 210 may, after identifying a client 220 for potential inclusion with a public channel but before actually subscribing the client 220 to the public channel, prompt the client 220 asking the client 220 whether they wish to be subscribed to the public channel. The client 220 may then accept or reject subscription to the public channel. In this manner, clients 220 may avoid unwanted or unsolicited communication from a channel that they are not interested in.

Figure 5:
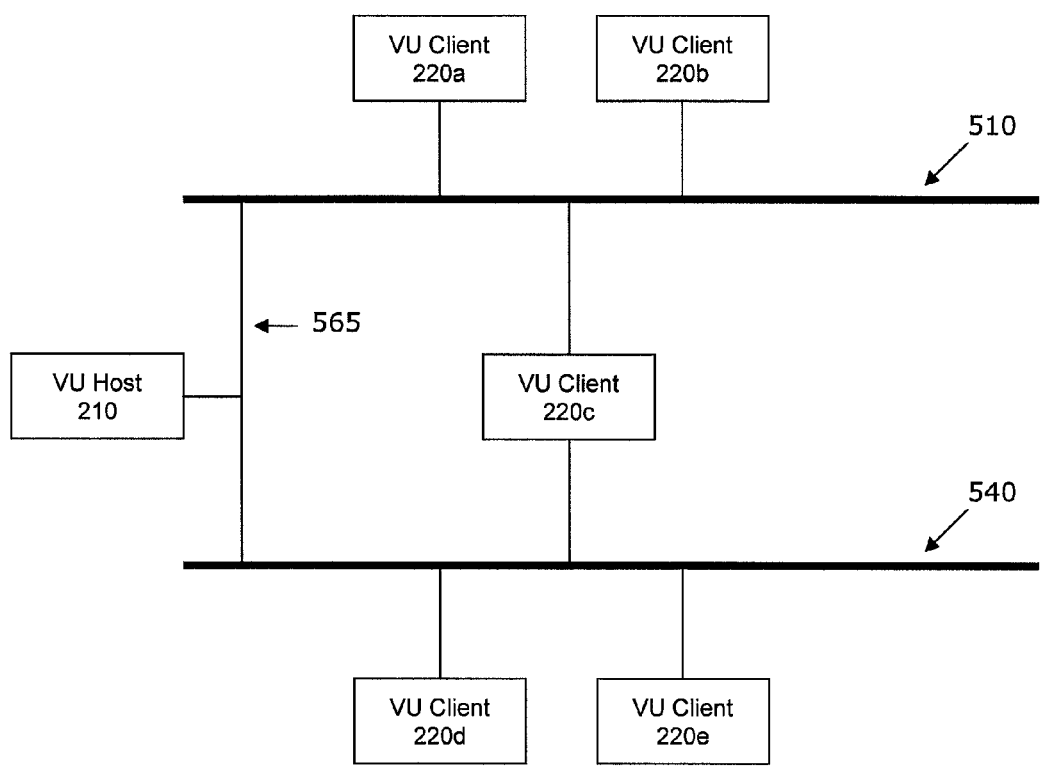

FIG. 5 shows an aspect of the invention in which plural channels are linked together. For example, channel 510 may be a private channel assigned to client 220a, and clients 220b, 220c are subscribed to channel 510. Channel 540 may be a separate private channel assigned to client 220c. Clients 220d and 220e are subscribed to channel 540. In embodiments of the invention, client 220c is associated with both channels 510 and 540 and may operate to link channels 510 and 540. For example, at the request of linking client 220c, the host 210 may operate to cause any data placed on either channel 510, 540 to be sent to all clients 220a-e associated with both channels. For example, when client 220e places data on channel 540, clients 220a-d all receive that data, due to the linking of the channels.

In the embodiment shown in FIG. 5, the linking client (e.g., client 220c) may remove the link at any time, for example, by asking the host 210 to disable the link, going off line, etc. Alternatively to using a linking client, the host 210 may establish a link between two channels that do not share a common client 220. For example, the owners of each respective private channel may request the host 210 to create a link between their channels, even though there is no client 220 in common between the two channels. In this situation, the host 210 initiated link between the channels, e.g., the host bridge 565, may persist even when the owners of the respective channels are offline. In embodiments, the link may be instantiated by the host 210 for a predefined period of time, at a specific period of time each day, or according to any other suitable parameter(s). For example, the host bridge may be instantiated for a predefined finite time period such that information channels are unlinked after expiration of the predefined finite time period.

Although linking of two private channels is described, the invention is not limited to linking only two private channels. For example, a public channel may be linked to a private channel. Additionally or alternatively, more than two channels may be linked in any suitable manner. For example, a first private channel may be linked to a public channel by a host bridge, and the public channel may be linked to a second private channel by a linking client 220.

Figure 6:
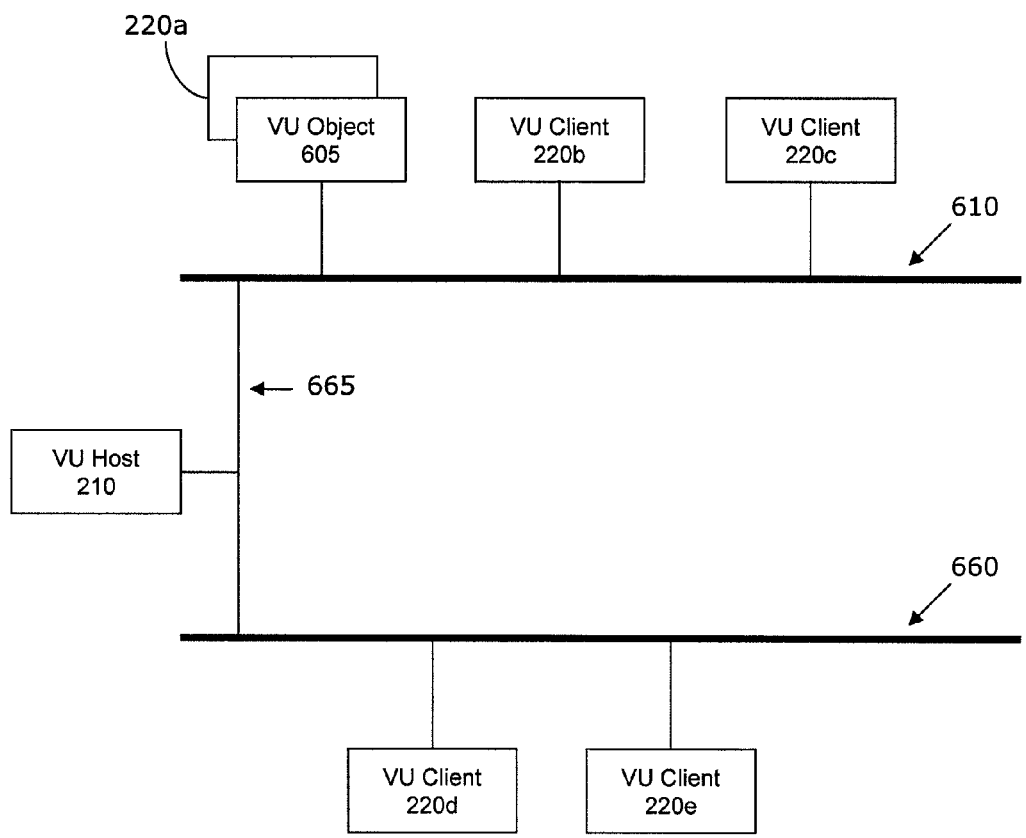

In embodiments, virtual world objects may be assigned private channels. FIG. 6 shows an example of a virtual world object 605 that represents a conference call within a virtual world, where the conference call object 605 is assigned a private channel 610 by the host 210 (e.g., in a manner similar to that described above with respect to FIG. 3). Similar to channels assigned to avatars, channels assigned to objects may be provided with an alpha-numeric identifier (e.g., channel number "2002") by the host 210. The owner (e.g., client 220a) of the conference call object 605 can send invitations to other clients 220b, 220c (e.g., avatars) to join the channel 610.

When an invitation is accepted, the host 210 operates to subscribe the clients 220b, 220c to the channel 610. In this manner, plural avatars may be connected to the VU conference call object 605, sharing information via the channel 610, while the owner 220a of the conference call object 605 controls who is subscribed to the channel.

An aspect of the invention involves the ability to "daisy chain" multiple private and/or public channels together. For example, still referring to FIG. 6, private channel 660 is assigned to client 220d by host 210, and host bridge 665 links channels 610 and 660 together. When the host bridge 665 is instantiated, both the owners of channels 610 and 660 can invite new avatars (e.g., client 220e) to join the conference call of object 605. By daisy-chaining these channels 610 and 660 together, authorization of which avatars and/or virtual world transceivers to include on the conference call can be distributed amongst the respective owners (e.g., clients 220a and 220d). Implementations of the invention therefore may simplify the underlying data transport. By carefully selecting linking clients and/or host bridges that span different virtual world regions, data transfer across large distances can be reduced, in a manner similar to relay stations and proxies.

Figure 7:
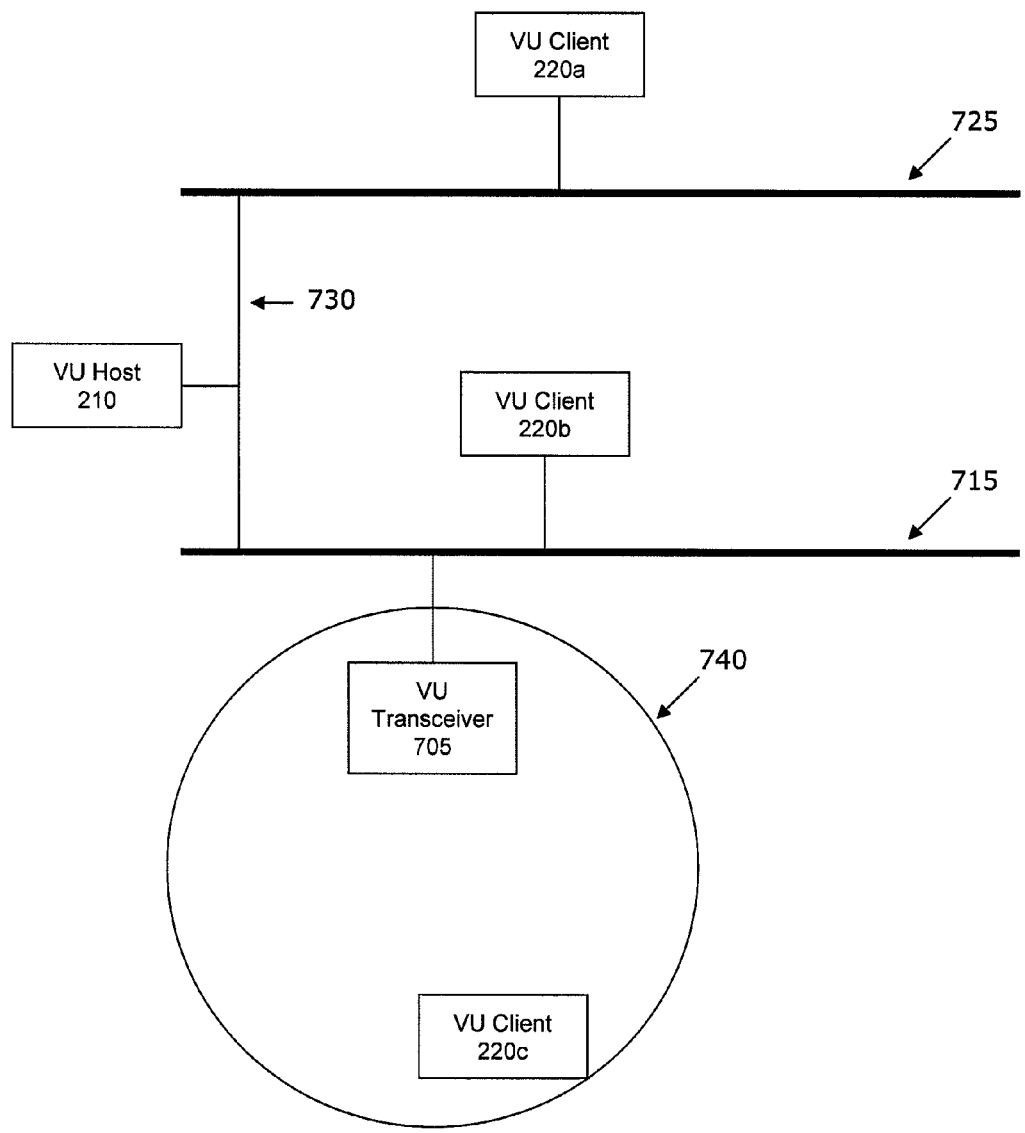

In embodiments, VU objects associated with a channel may function as transceivers of data. For example, as shown in FIG. 7, client 220b owns channel 715 and client 220a owns channel 725, the channels having been assigned by host 210. A transceiver object 705 is associated with channel 715 and may be programmed (e.g., via appropriate scripting) to function as a loud speaker. As such, any data placed on private channel 715 is emitted by the object 705 in a proximity-based communication manner. Moreover, as channel 715 is linked or bridged to channel 725, via host bridge 730 (or linking client, not shown) then any data placed on channel 725 is also emitted by object 705. In this manner, any avatar (e.g., client 220c) within the proximity-based broadcast range 740 of the object 705 will receive data from the channels 715, 725, even though this avatar (e.g., client 220c) is not subscribed to (e.g., associated with) either of these channels 715, 725

Although a loudspeaker transceiver object 705 is described, the invention is not limited to this example. Instead, any suitable type of transceiver object may be used within the scope of the invention, such as, for example: a loudspeaker, microphone, rich site summary (RSS) feed, visual VU screen, external application linkage, etc.

Implementations of the invention contemplate and include the creation of predefined VU objects that are designed to function with aspects of the invention as described above. For example, such predefined objects may be designed to integrate with at least one of: third party applications, data feeds from outside the VU, application servers, websites, data storage devices, etc. Through the use of such predefined objects, embodiments of the invention utilize information channels that can be used to link not only VU objects, but also objects external to the VU.

In embodiments, when an avatar is associated with more than one channel, the avatar is provided with the ability to choose (e.g., select) a particular channel on which to send and/or receive data. This may be accomplished, for example, through the use of virtual sockets that are implemented in the programming of the VU, e.g., via appropriate script(s). The channels available to an avatar may be presented to the client of the avatar via graphical user interface (GUI), such as a drop down menu on the user's display. Using the GUI, the user is able to select the channel on which they would like for their avatar to communicate. The drop down menu may also be used to provide additional features, such as allowing a user to request connection to a private channel that they do not own, check the status of all available channels, etc.

Figure 8:
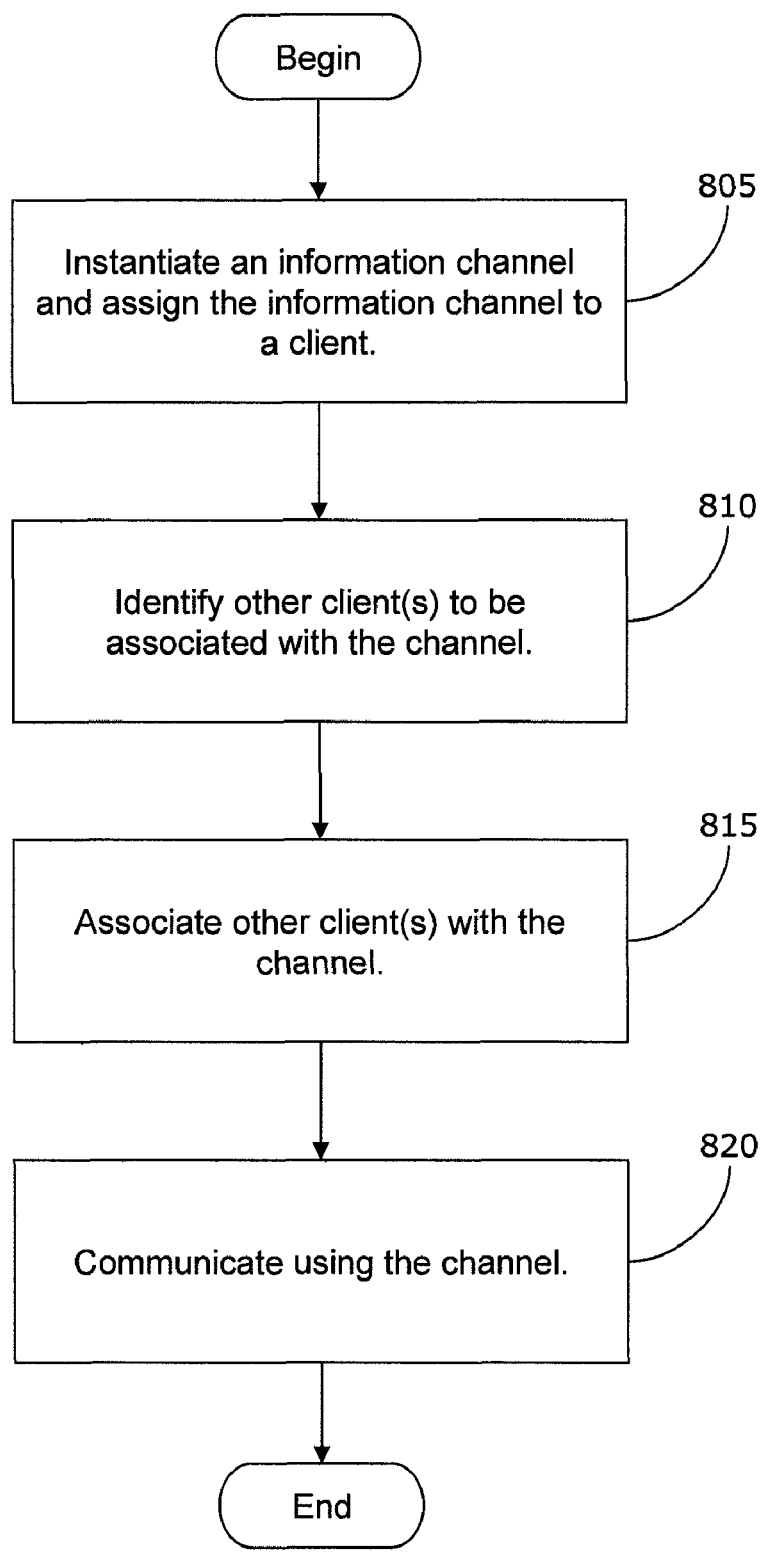
FIGS. 8 and 9 show flow diagrams depicting implementations of methods according to aspects of the invention.
Figure 9:
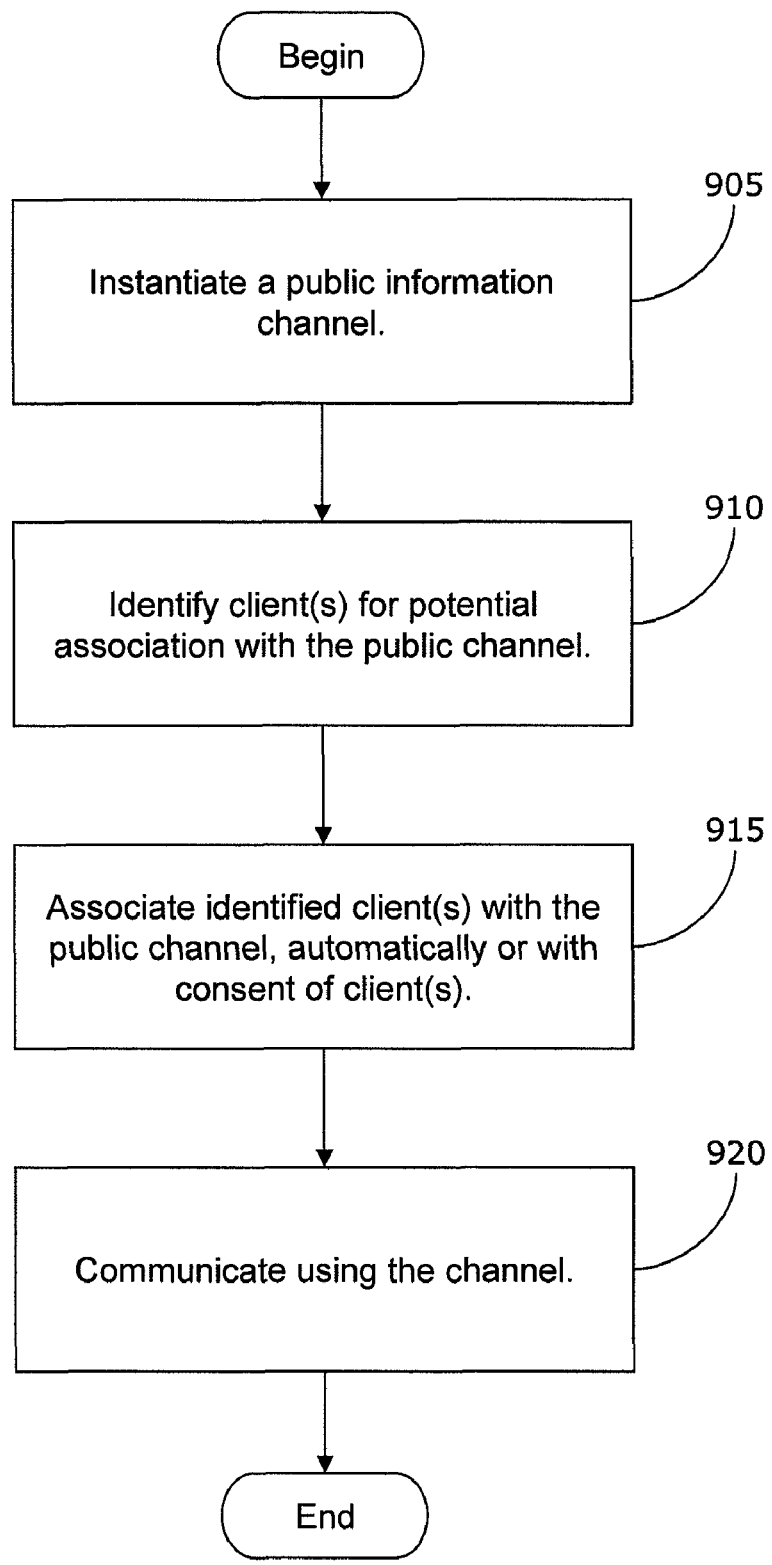

FIGS. 8 and 9 show flow diagrams implementing aspects of the invention. The steps of the flow diagram described herein may be implemented in the environment of FIGS. 1-7. The flow diagram may equally represent a high-level block diagram of the invention. The steps of the flow diagram may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-7. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 8 shows a flow diagram depicting steps of a first method for transferring data according to aspects of the invention. At step 805, a VU host instantiates an information channel within the VU and assigns the information channel to a VU client. This may be performed in a manner similar to that described with respect to FIGS. 2-7. For example, the host may assign a particular channel having a unique identifier to the client. The channel may be arranged to carry data, such as, for example, text data, audio data, etc. The client may be an avatar or a registered VU object. The client may be considered as the owner of the channel, as the client has the authority to grant access to the channel by other clients.

At step 810, at least one other client to be associated with the channel is identified. This may be performed in a manner similar to that described with respect to FIGS. 2-7. For example, the owner of the channel (e.g., the client to which the channel is assigned) may indicate to the host the identity of another client to be associated with the channel. Additionally or alternatively, the other client may request association with the channel through the host, such that the host contacts the owner with an option to grant or deny access to the other client. Plural clients for association with the channel may be identified to the host, simultaneously or otherwise. The at least one other client may be an avatar or a registered VU object.

At step 815, the host associates the at least one other client identified in step 810 with the channel. This may be performed in a manner similar to that described with respect to FIGS. 2-7. Association with the channel, in this context, refers to the ability to send and/or receive data on the channel. For example, the host may maintain a list of clients associated with the channel. Moreover, the host may operate such that any client associated with the channel, including the owner, receives any data that is placed on the channel by another client associated with the channel, including the owner.

At step 820, data is communicated using the channel. This may be performed in a manner similar to that described with respect to FIGS. 2-7. For example, a first client may place data on the channel, by for example, selecting the channel from a drop down menu in the graphical user display of the VU and subsequently typing on a keyboard, speaking into a microphone, dragging a file icon onto a channel icon, etc. The data placed on the channel is transmitted from the client to every other client associated with that channel, including, possibly, the owner. The data may be conveyed to the other clients via the host. For example, the host may receive the data from the client sending the data, and re-transmit the data to each other client associated with the channel. Additionally or alternatively, the data may be conveyed from the first client to each other client associated with the channel in a peer to peer manner.

Step 820 may include transmitting the data placed on the channel to any other channels that are linked to the channel. This may be performed in a manner similar to that described with respect to FIGS. 2-7. For example, the host may operate to provide another channel that is linked to the first channel (e.g., by a linking client and/or a host bridge) with any data that is placed on the first channel, and vice versa. Moreover, the transmitting data in step 820 may be performed across a plurality of channels that are daisy-chained together by various linking clients and/or host bridges. Furthermore, step 820 may also include sending data to and/or receiving data from transceiver objects that are linked to the channel. This may be performed in a manner similar to that described with respect to FIG. 7.

FIG. 9 shows a flow diagram depicting steps of a second method for transferring data according to aspects of the invention. At step 905, a VU host instantiates a public information channel in the VU. At step 910, the host identifies clients of the VU that are potential candidates for association with the public channel from step 905. This may be performed in a manner similar to that described with respect to FIGS. 2-4. For example, the host may identify clients having a common characteristic, such as, for example, a common geographic location within the VU, a common profile parameter, and/or a common inventory item.

At step 915, at least some of the clients identified in step 910 are associated with the public channel. This may be performed in a manner similar to that described with respect to FIGS. 2-4. In one aspect of the invention, the host automatically associates each client from step 910 without any input from the client. In another aspect of the invention, the host provides each client with an opportunity to accept or deny association with the public channel. In the former case, all clients identified in step 910 are associated with the channel at step 915. In the latter case, only those clients that accept the invitation to be associated are associated with the channel in step 915.

At step 920, data is communicated using the channel. This may be performed similar to step 820, described with respect to FIG. 8. In this manner, implementations of the invention provide a communication system that includes audio and/or data transfer, as well as the ability to dynamically change which avatars and/or objects are connected to each other during a data transfer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of providing communication in a virtual universe (VU), comprising:
   instantiating an information channel for a first client of the VU, said information channel being a data link over which data may be transferred to another client of the VU;
   assigning the instantiated information channel to the first client of the VU;
   associating at least one additional client of the VU to the information channel assigned to the first client;
   conveying data placed on the information channel to the first client and the at least one additional client;
   linking the information channel to a second information channel, wherein at least one other client is associated with the second information channel; and
   conveying data placed on either the information channel or the second information channel to the first client, the at least one additional client, and the at least one other client,
   wherein:
      the linking comprises creating a host bridge between the information channel and the second information channel; and
      the host bridge is instantiated for a predefined finite time period, and the information channel and the second information channel are unlinked after expiration of the predefined finite time period.

2. The method of claim 1, wherein:
   the information channel is a private channel, and
   the at least one additional client is associated upon authorization by the first client.

3. The method of claim 1, wherein:
   the at least one additional client comprises a plurality of additional clients, and
   the data placed on the information channel is made available to the plurality of additional clients.

4. The method of claim 1, wherein the first client and the at least one additional client are associated with avatars of the VU.

5. The method of claim 1, wherein at least one of the first client and the at least one additional client are associated with a registered object of the VU.

6. The method of claim 1, wherein a host of the VU performs the instantiating and assigning, the associating, and the conveying.

7. The method of claim 1, wherein the linking comprises associating at least one linking client to both the information channel and the second information channel.

8. The method of claim 7, wherein the information channel and the second information channel are unlinked when the linking client goes offline.

9. The method of claim 1, further comprising associating a VU transceiver object with the information channel, wherein the VU transceiver object comprises one of:
   a VU loud speaker object;
   a VU microphone object;
   a VU rich site summary (RSS) feed object;
   a visual VU screen object; and
   an external application linkage.

10. The method of claim 1, wherein the data comprises at least one of text data and audio data.

11. The method of claim 1, wherein at least one of the instantiating and assigning, the associating, and the conveying is performed by a service provider under a subscription and/or fee agreement and/or based upon advertising content to one or more third parties.

12. The method of claim 1, wherein a service provider at least one of creates, maintains, deploys, and supports a computer infrastructure that performs at least one of the instantiating and assigning, the associating, and the conveying.

13. The method of claim 1, further comprising:
   presenting to the first client a graphical user interface (GUI) that allows the first client to select between the information channel and the second information channel.

14. The method of claim 1, further comprising, receiving a message from the first client, the messaging including an identification of the at least one additional client and an instruction to grant access to the channel to the at least one additional client.

15. The method of claim 1, wherein the information channel of the first client is a private information channel, said private information channel being one of a plurality of private information channels automatically instantiated and assigned to a respective plurality of clients of the VU.

16. The method of claim 1, further comprising, assigning the first client and the at least one additional client to a public channel.

17. The method of claim 16, wherein said assigning the first client and the at least one additional client to the public channel is automatically performed based on an avatar the first client and an avatar of the second client being within a predefined area of the VU.

* * * * *